H. STAUB & C. DUERST.

BOTTLE FILLING APPARATUS.

No. 11,667. Reissued May 31, 1898.

WITNESSES

T. A. Ommen

Geo. B. Blemming

INVENTORS

Henry Staub

Casper Duerst by Bakewell & Bakewell their attys.

UNITED STATES PATENT OFFICE.

HENRY STAUB AND CASPER DUERST, OF ALLEGHENY, PENNSYLVANIA, ASSIGNORS, BY MESNE ASSIGNMENTS, TO THOMAS McKENNA, OF PITTSBURG, PENNSYLVANIA.

BOTTLE-FILLING APPARATUS.

SPECIFICATION forming part of Reissued Letters Patent No. 11,667, dated May 31, 1898.

Original No. 560,070, dated May 12, 1896. Application for reissue filed August 24, 1897. Serial No. 649,410.

*To all whom it may concern:*

Be it known that we, HENRY STAUB and CASPER DUERST, of Allegheny, in the county of Allegheny and State of Pennsylvania, have invented a new and useful Improvement in Bottle-Filling Apparatus, of which the following is a full, clear, and exact description, reference being had to the accompanying drawings, forming part of this specification, in which—

Figure 1:
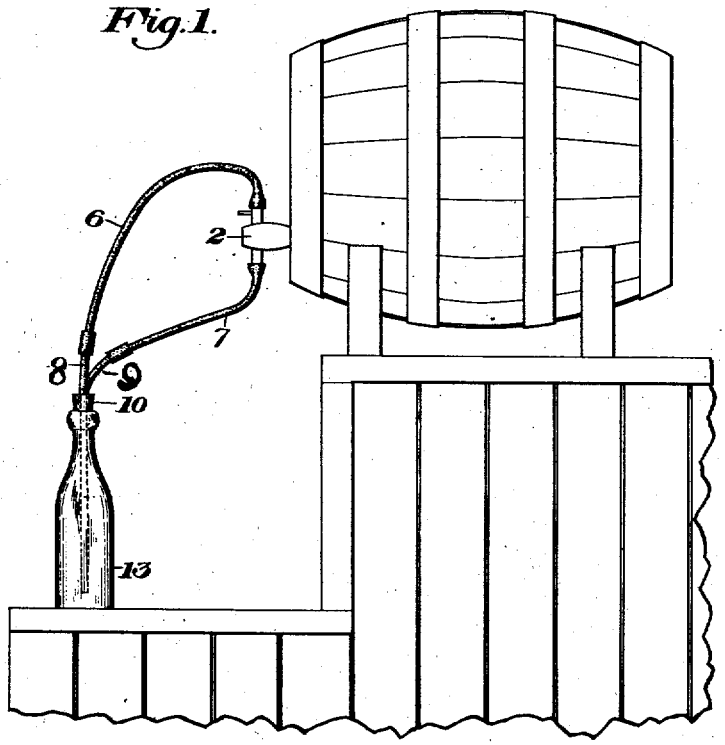
Figure 2:
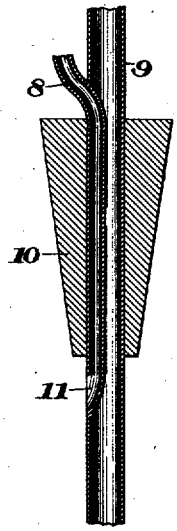
Figure 3:
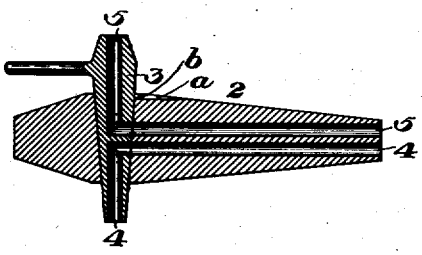
Figure 4:
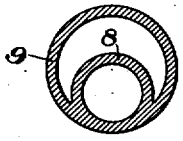

Figure 1 is a side elevation showing our apparatus in position for bottling from a barrel. Fig. 2 is an enlarged section showing the stopper portion of the apparatus. Fig. 3 is an enlarged sectional view of the spigot, and Fig. 4 is a cross-sectional view of the stopper of Fig. 2.

Our invention relates to the apparatus employed for filling bottles with malt liquors, such as beer, ale, &c., from kegs or receptacles, and is designed to provide improved means whereby the froth or foam passing into the bottles will be forced back into the barrel, so that the bottle will be completely filled with clear liquid. Heretofore in the bottling of such liquors it has been extremely difficult to completely fill the bottle with clear liquid on account of the foam and air passing into it with liquid. Our invention overcomes this difficulty; and it consists in a spigot provided with separate channels or passages having connections leading therefrom into the bottle, one of said connections being arranged to pass the foam and air back through the spigot into the keg or receptacle.

It also consists in the construction and arrangement of the parts, as hereinafter more fully described, and set forth in the claims.

In the drawings, 2 represents our improved spigot or bung, having formed therein a lower passage-way 4 for the liquor and a separate upper channel 5, through which the froth and air are passed back into the keg or receptacle. These passages or channels extend in opposite directions through a way-cock 3 in the spigot or bung, the passage 5 terminating at the top of the way-cock and the passage 4 at its bottom. To the upper end of the way-cock is secured a flexible tube 6, while to its lower end is secured a tube 7, these flexible tubes being connected at their other ends to the ends of tubes 8 and 9, respectively, which are secured in a stopper 10. The tube 9 extends through the stopper and is provided with a flexible extension projecting toward the bottom of the bottle 13, in which the stopper is inserted, while the tube 8 opens outwardly at a point just below the stopper, as shown at 11 in Fig. 2.

In using the apparatus the spigot is driven into the tapping bung-hole of the keg or barrel, and the stopper being forced into the mouth of a bottle the way-cock 3 is turned and the liquid will flow into the bottle through the tube 7, carrying with it some froth and air. As the liquid rises in the bottle the foam and air will be driven upwardly through the tube 8, tube 6, and channel 5 back into the keg, solid liquid taking its place in the bottle. The flow of liquid will automatically stop when the bottle is filled, so that there is no danger of an overflow. We preferably provide coacting stops *a* and *b* upon the way-cock and the spigot, so as to regulate the turning of the cock.

The advantages of our invention will be apparent to those skilled in the art, since while the pressure is constantly maintained upon the liquid in the bottle the lighter frothy portion and the air will be forced back into the barrel or receptacle, thus allowing the bottle to become completely filled with solid liquid.

Many changes may be made in the form and arrangement of the parts without departing from our invention, since

What we claim is—

1. In bottling apparatus, the combination with a plug arranged to be driven into the tapping bung-hole of the keg or barrel, and having separated channels therein which open at the inner portion of the plug so as to be below the level of the liquid in the barrel, of a bottle-stopper having similar separate channels therethrough, connections between the corresponding channels in the plug and stopper, and valve mechanism arranged to control the flow of liquid through the bung or plug.

2. In bottling apparatus, a spigot having separated passages formed in its body, said passages extending through projecting nozzle portions of the spigot and opening at the inner portion of the same so as to be below the level of the liquid in the keg or barrel, flexible tubes connected to the nozzles and a bottle-stopper having separate passages therethrough to which the flexible tubes lead.

3. In bottling apparatus, a spigot-plug having separate passages opening at the inner end of the same so as to be below the level of the liquid in the keg or barrel and connecting with similar passages in a way-cock located in the plug, a bottle-stopper, and tubes extending from the channels of the way-cock through the stopper.

4. In a device of the character described, a spigot having longitudinal air and liquid passages and an exterior shoulder, a turn-plug having an air-passage in its top, a liquid-passage in its bottom and provided with a lug to engage the shoulder of the spigot, said passages in the plug being separated by a partition, tubes connecting with the air and liquid passages and in combination, a stopper having a central aperture to receive a pipe having an interior tube, the pipe conveying liquor into the bottle and the interior tube conveying the air from the bottle, the tubes of the spigot being connected with the pipe and tube of the stopper, as and for the purpose described.

5. In a bottling device, a spigot having longitudinal ways to convey liquid and air, a turn-plug having an opening at the top communicating with the air-passage, and an opening in its bottom connecting with the liquid-passage, the openings at the top and bottom being separated, a lug on the turn-plug to engage the shoulder of the spigot, tubes connecting with the top and bottom passages of the turn-plug, and in combination, a stopper having a central aperture, a pipe extending through the aperture and adapted to convey liquid, an internal tube cast with the pipe, said tube protruding above the stopper and having an opening through the wall of the pipe below the stopper to convey air from the bottle to the air-tube of the spigot, as and for the purpose described.

In testimony whereof we have hereunto set our hands this 22d day of July, 1897.

HENRY STAUB.
CASPER DUERST.

Witnesses.
C. BYRNES,
H. M. CORWIN.